United States Patent [19]

Johnson

[11] 3,824,730

[45] July 23, 1974

[54] FISHING ROD HOLDER

[76] Inventor: Robert L. Johnson, P.O. Box 100, Glendive, Mont. 59330

[22] Filed: June 27, 1973

[21] Appl. No.: 374,181

[52] U.S. Cl. ............................................. 43/17
[51] Int. Cl............................................. A01k 97/12
[58] Field of Search................................. 43/16, 17

[56] References Cited
UNITED STATES PATENTS

| | | | |
|---|---|---|---|
| 1,021,147 | 3/1912 | Green | 43/17 |
| 2,624,972 | 1/1953 | Burg | 43/17 |
| 2,732,649 | 1/1956 | Tuttle | 43/17 |

Primary Examiner—Warner H. Camp
Attorney, Agent, or Firm—Merchant, Gould, Smith & Edell

[57] ABSTRACT

The disclosed device comprises a frame mounting a rotatable shaft for holding a fishing rod in a suitable position for fishing. The device permits the rod to move downwardly in response to a pull on the fishing line. This downward movement rotates the shaft and a keeper plate mounted thereon releases a signaling device. Preferably, a stop element mounted on the frame under the travel of the keeper plate ensures that the signaling device will be released, and adjustment of the relative positions of the shaft and/or keeper can determine the sensitivity of the signaling function of the device.

7 Claims, 5 Drawing Figures

FISHING ROD HOLDER

FIELD OF THE INVENTION

The present invention relates to a fishing rod holder of the type having a signaling means to indicate even a momentary pull on or downward movement of the pole, e.g. a pull caused by a fish tugging on the line. An aspect of this invention relates to a fishing rod holder of the type provided with a raisable and lowerable signal means which is raised in response to movement (e.g. downward movement) of the fishing rod. Another aspect of this invention relates to a relatively simple triggering or release device for initiating display of the signal means.

DESCRIPTION OF THE PRIOR ART

It is often desirable to provide a device for holding a generally unattended fishing rod in a position suitable for catching fish. It is also desirable to provide the fishing rod or fishing pole holder with a signal device (e.g. a small flag) which pops up when a fish has tugged on the line. Several devices have been suggested for accomplishing these objectives.

One difficulty with some of the suggested devices is that they are limited to fishing equipment which makes use of a reel. Another difficulty is that some of the devices are too sensitive to even the slightest pulls on the line, resulting in accidental or undesired triggering of the signal, while others are insufficiently sensitive and require a hefty pull to raise the signal. These drawbacks can be avoided through the use of complex mechanical features and/or electrical signaling devices or the like. However, the need still exists for a relatively simple, essentially mechanical device (e.g. one that does not require an internal or external power supply) which can be used with virtually any type of fishing equipment and which has a signal triggering device adapted for simple mechanical adjustment for varying degrees of signal-triggering sensitivity.

This invention contemplates satisfying this need.

For representative examples of prior art devices, see the following U.S. Pat. Nos.: 1,451,124 (Stolze), 1,980,255 (Covich), 2,693,660 (Nebergall et al.), 2,713,741 (Gnagy), 2,504,385 (Braatz), 2,795,072 (Porter), 2,934,849 (Kampa), 3,037,314 (Hardy), 3,516,190 (Cook), 3,546,805 (Schaeffer), and 3,568,352 (Hill).

SUMMARY OF THE INVENTION

It has now been found that adjustable triggering of the signal means for the fishing rod holder can be provided by a surprisingly simple arrangement. The handle or other portion of the fishing rod is engaged in a suitable fastening means mounted on a rotatable shaft. The shaft is journaled in a frame, and each end of the shaft is provided with keepers for maintaining the shaft in a properly journaled position. One of the keepers is a simple, circular plate-like element, but the other keeper has an elongated shape, so that a remote end of this keeper describes an arc concentric with the axis of the shaft when the fishing rod is pulled downward. The signal means is provided by a flag or the like at the end of a flexible staff. One end of the staff is fixed to the frame, while the other is adapted to loosely engage an upper edge of the elongated keeper. Movement of the keeper in a downward arc, responsive to downward movement of the rod, releases the free end of the staff, so that it springs upward, raising the signal flag. As will be apparent to those skilled in the art, the flexible staff must be flexed or bent over in order for the free end to engage the keeper. The resulting tension causes the keeper to be biased toward its normally upright position, and it is only necessary to release the free end of the staff to cause this end to spring upward in a rapid, signal-raising movement.

An important feature of this invention is the simple triggering arrangement provided by the elongated keeper and, preferably, an additional element, affixed to the frame, located generally behind the segment or area swept out by the elongated keeper in its downward, arcuate movement. Although the invention can be operative without this additional element, a high degree of adjustability of the trigger mechanism is possible when this element is included. The element is, very simply, a stop means which prevents the free end of the staff engaged on the edge of the keeper element from following the downward arc of the keeper due to frictional forces of the like. Without the stop element, the triggering device of this invention is somewhat insensitive to pulls on the fishing line. With the stop element, the triggering device can be set as sensitive or insensitive as desired, depending on the normal or "set" position of the keeper, i.e. the position corresponding to the bent-over position of the staff and the relatively upward (unpulled) position of the fishing rod. The elongated keeper is thus an extremely simple trigger set mechanism which, in combination with the stop element, controls the sensitivity of the entire device.

The various preferred features of this invention will become clear by referring to the description of the drawing which follows.

DETAILED DESCRIPTION OF THE PREFERRED EMBODIMENTS

Figure 1:
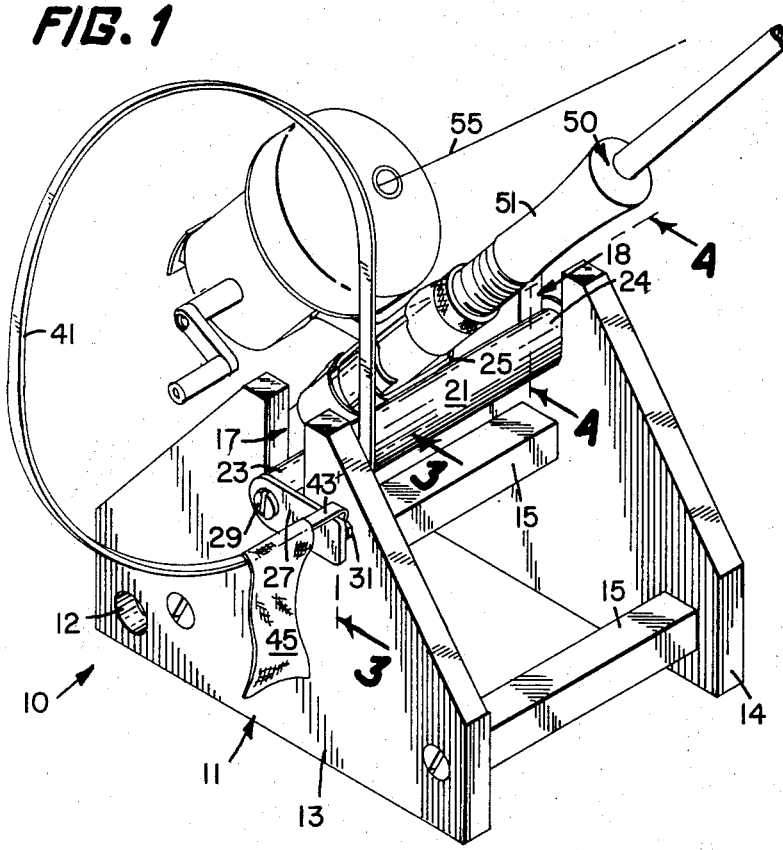
FIG. 1 is a perspective view of a rod- or pole-holding device of this invention shown in combination with a fishing rod of conventional design.

In this description, like numerals denote like parts in the various views of the Drawing.

As will be apparent from FIG. 1, the basic elements of a device 10 of this invention include a frame 11; a rotatable shaft 21 journaled in frame 11; a flexible staff 41 having a fixed end secured to frame 11 by bolt 42 (FIG. 3) and a free end 43 constructed to engage the triggering mechanism and also support a signal flag 45; and a suitable fastening means 25 for holding the fishing rod or pole 50. The preferred form of triggering device comprises a keeper plate 27, attached to shaft 21, and a stop element 31 (preferably threaded into bolt 42) protruding from a side support member 13 of the frame 11. The function of the triggering device will be described in detail subsequently.

The frame 11 comprises two side support members 13 and 14 arranged in spaced apart relation and held together by suitable cross members 15. A hole 12 (FIGS. 1 and 2) is provided in each side support member 13 and 14 so that an anchoring rope can be passed through frame 11. Support members 13 and 14 are provided with journal bearing slots 17 and 18 wherein portions 23 and 24 of the shaft 21 are journaled.

Figure 3:
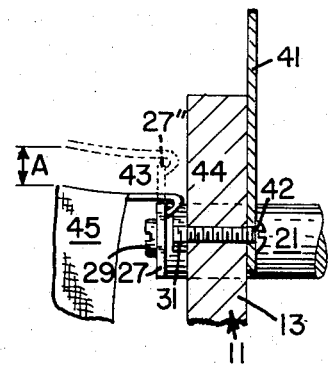
FIG. 3 is a cross-sectional view taken along line 3—3 of FIG. 1.
Figure 2:
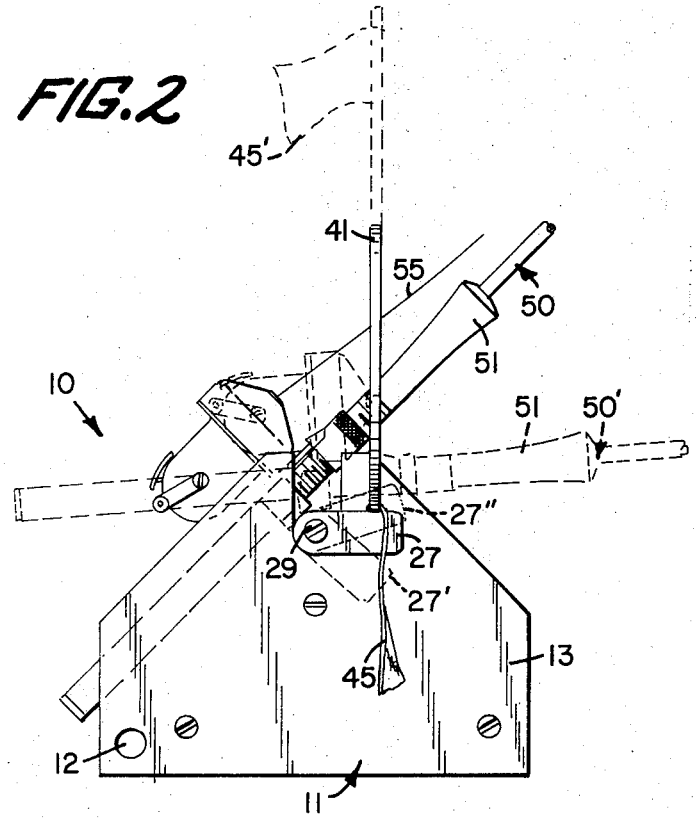
FIG. 2 is a side elevational view of the device and the rod shown in FIG. 1 with the signal-release position of the rod and the released signal position shown in phantom.
Figure 4:
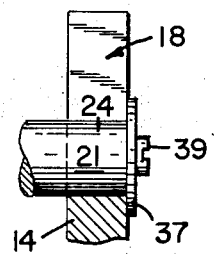
FIG. 4 is a cross-sectional view taken along line 4—4 of FIG. 1.

The shaft 21 is kept in the proper journaled position by keeper plates 37 (FIG. 4) and 27 (FIGS. 1–3). Keeper plate 37 is a simple circular disc attached to shaft 21 by a simple, slot-head screw 29 coaxial with shaft 21. Screw 29 which holds keeper 27 to the journaled end 23 of shaft 21 is also threaded coaxially into shaft 21. However, keeper 27 has a generally rectangular periphery, so that the center of this periphery is displaced radially outward from the axis of shaft 21. Therefore, downward movement of keeper plate 27 (e.g. to position 27' shown in FIG. 2) ultimately releases free end 43 of shaft 41, even though this downward movement is concentric with the axis of shaft 21.

Support member 13 is provided with stop element 31. Stop element 31 can be a simple screw threaded into an outside surface of support member 13 or, as shown in detail in FIG. 3, a nut threaded onto the bolt 42 which holds the fixed end of shaft 41 in place. When staff 41 and signal flag 45 are in the bent-over or flexed position so that free end 43 of the staff rests upon the top edge of keeper plate 27, a hook-like catch 44 ensures that free end 43 will not slide off of keeper plate 27. However, free end 43 and catch 44 are merely retained by keeper plate 27 in a channel formed by the inside surface of keeper plate 27 and the outside surface of support member 13. This arrangement (i.e. the "set" position of the combination of keeper, shaft, and stop elements which comprises the triggering device) is a more or less loose, rather than fixed, engagement, and frictional forces are ordinarily not involved. However, if keeper plate 27 begins to swing downward, frictional forces could drag the free end 43 or the catch 44 along with the keeper 27 for a substantial fraction of an inch or more. Alternatively, if keeper plate 27 were close enough to support member 13, catch 44 could be jammed into the channel formed by these two elements so tightly that downward movement of keeper plate 27 could be somewhat hindered.

The stop element 31 (the nut threaded onto bolt 42) prevents these conditions from occurring. With stop element 31, it is unnecessary to space keeper plate 27 and support member 13 so closely as to frictionally engage catch 44 (though this arrangement is also operative when stop 31 has been provided). Regardless of how tightly or loosely catch 44 is retained, stop 31 limits its downward movement and prevents it from following the downward movement of keeper plate 27.

Figure 5:
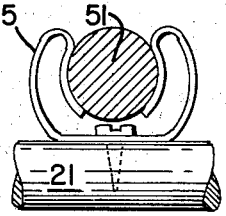
FIG. 5 is a fragmentary detail view of a fastening means for a pole held by the rod-holding device of FIG. 1.

The downward movement of keeper plate 27 is responsive to pulls on line 55 of the fishing pole or rod 50. Fishing rod 50 can be of any conventional design. In the embodiment shown, fishing rod 50 is provided with the usual handle 51. Handle 51 engages a suitable fastening means 25 mounted on shaft 21 (see FIGS. 1 and 5). Although fastening means 25 has a set position (shown in FIGS. 1 and 2 to be such that the rod will be pointed upward at approximately a 45° angle), the upward angle of the rod can be varied in a simple manner by loosening screw 29, holding keeper plate 27 in the desired position, and rotating shaft 21 until the desired angle is reached. Alternatively, the angle of the fishing rod can be held fixed and the desired position of the keeper plate 27 can be varied; e.g. keeper plate 27 can be rotated slightly upward to a "set" position 27", which is inclined slightly upward from the horizontal. As will be apparent from FIGS. 2 and 3, the horizontal "set" position of keeper plate 27 provides extremely sensitive triggering. The slightest downward movement of pole 50 will release free end 43, since stop element 31 would prevent any significant following of the downward movement of keeper plate 27. However, when keeper plate is in "set" position 27", the sensitivity of the triggering mechanism of this invention is somewhat reduced. In keeper plate position 27", free end 43 has at least the possibility of following the downward movement of keeper plate 27 through a significant portion of distance a shown in FIG. 3. Thus, in this less sensitive "set" position 27", the triggering mechanism of this invention allows for relatively minor movement of rod 50 (e.g. caused by air currents or the like) without release of free end 43 and raising of signal flag 45 to the erect position 45' shown in phantom in FIG. 2.

OPERATION OF THE INVENTION

As will be apparent from the foregoing description, the first step in using a pole or rod-holding device of this invention is to decide upon the desired angle between the "set" position of fastening means 25 and keeper plate 27. Let us assume, for the moment, that the selected "set" position is the one shown in FIG. 1 and also shown in FIGS. 2 and 3 in solid lines. For this particular "set" position—a horizontal position for keeper plate 27 and a roughly 45° angle position for fastening means 25, handle means 51 of rod 50 will be at roughly a 45° angle to the axis of shaft 21 when the handle 51 is force fitted into fastening means 25. (The force fit in fastening means 25 can be, of course, sufficiently loose to allow easy removal of rod 50 from the holding device 10.) Staff 41 is then bent over from its erect position (see position 45' shown in phantom in FIG. 2) to its flexed position best shown in FIG. 1. In this flexed position, catch 44 of free end 43 can be slipped over the upper edge of keeper plate 27. So long as keeper plate 27 is in its horizontal position, catch 44 contacts the top edge stop element 31. Although staff 41 is under a considerable biasing force due to flexion, it remains in its flexed position due to physical retention of catch 44 in the narrow channel or groove defined by support member 13 and keeper plate 27.

When a fish takes the bait at the end of fishing line 55, rod 50 is pulled down to a nearly horizontal position 50' shown in phantom in FIG. 2. Keeper plate 27 moves in a downward arc concentric with screw 29 and the axis of shaft 21 to the release or triggered position 27', also shown in phantom in FIG. 2. Stop element 31 prevents free end 43 of staff 41 from following this downward arc. As a result, catch 44 is no longer retained within a groove or channel, and the bias operating on staff 41 forces it to slip off the top of stop element 31 and spring to its released (triggered) erect position 45', thus displaying signal flag 45 in a position remote from frame 11.

Keeper plate 27 need not be set in the horizontal position shown in FIG. 1 and in solid lines in FIGS. 2 and 3. By simply loosening screw 29, keeper plate 27 can be swung slightly upward to position 27'', shown in phantom in FIGS. 2 and 3, without disturbing the position of fastening means 25. In this slightly upward position, all of the operations previously described take place in substantially the same manner. However, catch 44 may not contact stop element 31 at all, or, if it does, it will first travel through distance *a*. Thus, it is possible, in this less sensitive setting of the trigger mechanism of this invention, that random movement of fishing rod 50 up and down throughout distance *a* will not result in release of free end 43, i.e. triggering of signal 45.

As the person skilled in the art will readily appreciate, there would be circumstances wherein the fisherman would prefer the most sensitive setting of the trigger mechanism, shown in FIG. 1 and in solid lines in FIGS. 2 and 3. On the other hand, there are conditions (e.g. on extremely windy days) when a less sensitive setting such as the raised keeper plate position 27'' (FIGS. 2 and 3) could be desirable. There can even be those rare conditions wherein the triggering mechanism could be set in the most insensitive possible manner. This could be done by removing or by-passing stop element 31 completely (though maintaining the attachment of the fixed end of staff 41 to support member 13), thus allowing for maximum following of keeper plate 27 by catch 44. Ordinarily, however, the use of stop element 31 is greatly preferred.

As will be apparent to those skilled in the art, any suitable wooden or metal or rigid plastic materials can be used to construct frame 11. Staff 41 is preferably constructed from a thin strip of flexible metal such as steel, though other materials can obviously be used.

What is claimed is:

1. A fishing rod holding device comprising:
    a. a frame,
    b. an elongated rotatable shaft journaled in said frame, at least a first end of said shaft extending outward, external to said frame, beyond the journaled portion of said free end,
    c. a fastening means for engaging the handle portion of a fishing rod whereby the handle is fastened generally normal to the longitudinal axis of said shaft,
    d. a flexible, elongated staff means having a fixed end fixedly attached to said frame and a free end for display of a signal means in response to rotational movement of said shaft, said staff means having a flexed position for maintaining said free end in closely spaced relation to said frame, and an extended position wherein said free end is relatively remotely positioned from said frame; and
    e. a rotatable keeper means for maintaining said flexible staff means in said flexed position, said keeper means being connected to said first end of said shaft for rotational movement along an arc concentric with the longitudinal axis of said shaft, said keeper means having a configuration such that the center of its periphery is spaced apart from said longitudinal axis, said periphery having an edge for non-fixedly engaging the free end of said staff means when said staff means is in said flexed position, thereby preventing extension of said staff means and retaining said free end in said closely spaced relation.

2. A device according to claim 1 wherein said device further comprises:

f. a stop element, mounted on said frame, for preventing said free end of said staff means from following the shaft-responsive rotational movement of said keeper means along said arc when said free end is engaged upon the edge of said keeper means, thereby facilitating release of said staff means from the flexed position in response to the shaft-responsive movement.

3. A device according to claim 2 wherein:
    said frame comprises first and second side support members arranged in spaced apart relation with the said shaft extending between and journaled in the side support members, said first end of said shaft extending beyond the portion thereof journaled in said first side support member, and
    said stop element is mounted on an external surface of said first side support member.

4. A device according to claim 2 wherein said staff means is provided with a hook-like catch means, at the free end thereof, for loosely engaging an edge of said keeper means.

5. A device according to claim 4 wherein said signal means is a flag-like element attached to said staff means adjacent said hook-like catch means; said extended position of said staff means is generally erect; and the display of said signal means in response to rotational movement of said shaft results from a generally upward movement of said staff means to said extended position.

6. A device according to claim 2 wherein said keeper means has an elongated periphery and is attached to said shaft in closely spaced relation to an end of said keeper means.

7. In a fishing rod holder of the type provided with a raisable and lowerable signal means which is raised in response to movement of the fishing rod,
    a. a frame comprising generally vertically extending first and second side support members in horizontally spaced apart relation;
    b. an elongated rotatable shaft extending between and journaled in said support members for free rotational movement in response to downward movement of the fishing rod, at least a first end of said shaft extending outward, external to said first side support member, beyond the journaled portion of said shaft;
    c. a fastening means for engaging the handle portion of the fishing rod intermediate said side support members and normal to the longitudinal axis of said shaft;
    d. a generally rectangular keeper plate, an end thereof being attached to said first end of said shaft and such that the other end is relatively remotely positioned from the longitudinal axis of said shaft whereby said keeper plate is constructed and arranged to move concentrically with said shaft from a retaining position to a relatively downward release position in response to downward movement of the fishing rod;
    e. a flexible, elongated staff means having a fixed end fixedly attached to an inside surface of said first side support member and a free end provided with a flag-like signal means and a catch means for loosely engaging an upper edge of said keeper plate, said flexible staff means having a bent over position wherein said catch means engages said upper edge when said keeper plate is in the retaining position and an extended, generally erect position, when said keeper plate is in the release position, wherein said free end and said flag-like signal means are raised above said frame; and f. a stop element, mounted on the outside surface of said first side support in between the area of movement of said keeper plate and said outside surface, for preventing the free end of said staff means from being pulled downwardly by said upper edge of said keeper plate when said staff means is in the bent over position and the said keeper plate is moving downwardly in response to downward movement of the fishing rod.

* * * * *